United States Patent [19]
Dowell

[11] Patent Number: 5,268,584
[45] Date of Patent: Dec. 7, 1993

[54] STRONG LIQUID-CRYSTALLINE POLYMERIC COMPOSITIONS

[75] Inventor: Flonnie Dowell, Los Alamos, N. Mex.

[73] Assignee: The United States of America as represented by the Department of Energy, Washington, D.C.

[21] Appl. No.: 894,752

[22] Filed: Jun. 5, 1992

Related U.S. Application Data

[63] Continuation of Ser. No. 277,085, Nov. 28, 1988, abandoned.

[51] Int. Cl.$^5$ .................. C09K 19/52; C09K 19/34; C09K 19/12; C09K 19/00
[52] U.S. Cl. ..................... 252/299.01; 252/299.6; 252/299.61; 252/299.66; 428/1
[58] Field of Search ........... 252/299.01, 299.6, 299.61, 252/299.66; 428/1

[56] References Cited

PUBLICATIONS

Ringsdorf et al., Makromol. Chem., Rapid Common., vol. 7, pp. 389–396, (1986).
Ringsdorf et al., Makromol. Chem., Rapid Common., vol. 7, pp. 381–388, (1986).
Ringsdorf et al., Makromol. Chem., Rapid Commun., vol. 6, pp. 291–299 (1985).
Arnold et al., Polymer Preprints, vol. 27, pp. 221–222, (1986).
Burkett et al., Polymer Preprints, vol. 28, pp. 278–279 (1987).

*Primary Examiner*—Philip Tucker
*Attorney, Agent, or Firm*—Dowell & Dowell

[57] ABSTRACT

Strong liquid-crystalline polymeric (LCP) compositions of matter. LCP backbones are combined with liquid crystalline (LC) side chains in a manner which maximizes molecular ordering through interdigitation of the side chains, thereby yielding materials which are predicted to have superior mechanical properties over existing LCPs. The theoretical design of LCPs having such characteristics includes consideration of the spacing distance between side chains along the backbone, the need for rigid sections in the backbone and in the side chains, the degree of polymerization, the length of the side chains, the regularity of the spacing of the side chains along the backbone, the interdigitation of side chains in sub-molecular strips, the packing of the side chains on one or two sides of the backbone to which they are attached, the symmetry of the side chains, the points of attachment of the side chains to the backbone, the flexibility and size of the chemical group connecting each side chain to the backbone, the effect of semiflexible sections in the backbone and the side chains, and the choice of types of dipolar and/or hydrogen bonding forces in the backbones and the side chains for easy alignment.

21 Claims, 16 Drawing Sheets

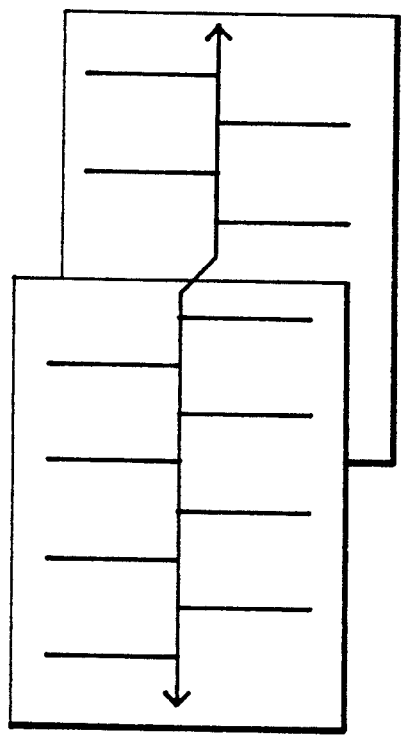
FIG.5c
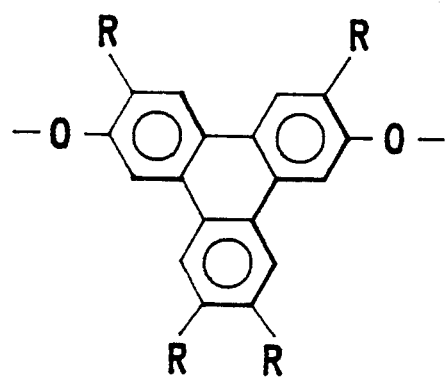
FIG.6a
R: $-O-(CH_2)_x-CH_3$
FIG.6b

STRONG LIQUID-CRYSTALLINE POLYMERIC COMPOSITIONS

The U.S. Government has rights in this invention pursuant to Contract No. W-7405-ENG-36 awarded by the U.S. Department of Energy.

CROSS REFERENCE TO RELATED APPLICATION

This application is a continuation of Ser. No. 07/277,085, filed Nov. 28, 1988, now abandoned entitled STRONG LIQUID-CRYSTALLINE POLYMERIC COMPOSITIONS.

BACKGROUND OF THE INVENTION

The present invention relates generally to polymers and more particularly to strong liquid-crystalline polymers.

Liquid crystals (LCs) are phases with partial molecular ordering intermediate between the random packing (disorder) of a liquid, and the regular three-dimensional packing (order) of a crystal. In the nematic LC phase, there is partial orientational ordering of the long axes of the molecules; in the smectic LC phases, there is partial orientational ordering (as in the nematic phase) and also partial positional ordering of the centers of mass of the molecules into layers. Liquid-crystal polymers (LCPs) are polymers that form solids by cooling from a LC phase (either melt or solution), rather than from an isotropic liquid phase (melt or solution) as is the situation with non-liquid-crystalline polymers. In general, the greater the crystalline order of the polymer, the greater the strength. More specifically, increasing the orientational ordering of the polymer molecules increases both the tensile strength and the tensile modulus of the polymer. (See, e.g., *Elasticity, Plasticity, and Structure of Matter*, third edition, edited by R. Houwink and H. K. de Decker, Cambridge at the University Press, 1979.) Certain solidified liquid-crystal polymers are used as stronger, lighter-weight replacements for metals, ceramics and other materials in various structural applications including auto and airplane parts, armor, belted tire cord, sails, mooring lines, etc. Advantages of solidified LCPs as compared with metals, ceramics, and other structural materials include low density (1–2 g/cm$^3$ versus about 7.8 g/cm$^3$ for steel). Moreover, LCPs can be synthesized in a wide variety of chemical structures permitting properties to be tailored to particular requirements.

The tensile strength of polymeric materials is in part due to the chemical bonding of atoms in very long chains (polymer molecules) in contrast to the weaker interactions (physical or metallic attractions between atoms) in other materials, such as metals. Solidification of polymers from a solution or a melt virtually always occurs more rapidly than the polymer molecules can arrange themselves in a regular ordered array characteristic of perfect crystalline order. Therefore, solid polymeric materials have significantly less than perfect crystalline order, especially in sample sizes suitable for applications. However, molecular ordering (and thereby strength) of a solid polymer can be increased by forming the solid by cooling from a phase with some orientational order already present (i.e., a LC phase). The partial disorder of this LC phase is important in that the LC phase has sufficient fluidity so that the polymer can be physically processed (formed, spun, etc.) before solidification.

Existing LCPs with structural uses are all backbone LCPs in which main chains (backbones) of the polymer molecules have a number of linearly connected, relatively rigid sections (formed by LC chemical structures having low molecular weight). The chains will pack together more efficiently if they align in such a manner that their backbones are parallel to each other. The rigid sections are rod- or disc-shaped sections having their long axes in the long axis of the backbone of the polymer. There can be semiflexible sections in the backbones, but rigid sections provide superior mechanical properties. The other general class of LCPs are the side-chain LCPs. Therein, the main-chain backbones are flexible (as in non-liquid-crystalline polymeric materials such as polyethylene), but the pendant side groups attached thereto have rod or disc-shaped rigid sections (again formed by small-molecule LC chemical structures) forming an overall structure having the general appearance of a comb. Such structures may pack together more efficiently if the side chains on neighboring backbones align and intermesh with each other in layers.

Present backbone LCPs have good mechanical properties (such as tensile strength and tensile modulus) parallel to the long axes of the backbones, but have poor mechanical properties (such as compressive strength) in the transverse direction. High-strength fibers consistently exhibit a tendency to fibrillate (i.e., individual strands in the fiber bundle separate). Therefore, current backbone LCPs are limited to superior mechanical properties in one dimension and are thereby limited in technical applications principally to fibers in woven fabrics and in composite matrices.

Several laboratories have prepared and investigated combined LCPs; that is, those with liquid-crystalline backbones and liquid-crystalline side chains. Most notably, the journal articles entitled "Combined Liquid Crystalline Polymers: Mesogens In The Main Chain And As Side Groups," by Bernd Reck and Helmut Ringsdorf, Makromol. Chem., Rapid Commun. 6, 291 (1985), "Structural Variations of Liquid-Crystalline Polymers: Cross-Shaped And Laterally Linked Mesogens In Main Chain And Side Group Polymers," by Sibylle Berg, Volker Krone, and Helmut Ringsdorf, Makromol. Chem., Rapid Commun., 7, 381 (1986), and "Combined Liquid-Crystalline Polymers: Rigid Rod And Semiflexible Main Chain Polyesters With Lateral Mesogenic Groups," by Bernd Reck and Helmut Ringsdorf, Makromol. Chem., Rapid Commun. 7, 389 (1986) all describe combined liquid-crystalline polymers having a wide variety of structures, but no investigation of the strength parameters of the generated compounds is mentioned. In fact, although the authors state in the first reference (page 297, lines 1–2) that a biaxial orientation has been observed for the species investigated, on page 393 of the third article, the authors show a figure (C) which is meant to explain the type of interaction which may lead to observed smectic phases. The long axes of the side chains associated with the backbone of one molecule align parallel to the long axes of the backbones of the molecules, thereby yielding a uniaxial orientation of the molecules. That is, the authors explain the observed bidirectional X-ray diffraction pattern for melt-drawn fibers as likely being the result of the existence of two orientations of uniaxial domains within the cross section of the investigated fibers. As will become clear hereinbelow, the Ringsdorf materials utilize side chains which are too flexible and/or have too great a spacing to provide significant increases in structural strength.

By contrast, in "Phenylbenzthiazole Pendent p-Terphenylene Rigid-Rod Benzobisazole Polymers," by J. Burkett and F. E. Arnold, Am. Chem. Soc. Div. Polym. Preprints 28, (2) 278 (1987) and in "Heterocyclic Pendant Rigid-Rod Lyotropic Liquid Crystalline Polymers," by Tsu-tzu Tsai and Fred E. Arnold, Am. Chem. Soc. Div. Polym. Preprints 27, (2) 221 (1986), the authors set out to improve solubility and compressive properties of rigid-rod polymers by structural modifications of the backbone. Pendant groups were utilized to prevent the close packing of the rods, thereby promoting solubility in solvents other than strong acids. It is reported that modulus and tenacity values are lower for pendant systems when compared with non-pendant systems, while compressive strain properties improved. However, in both references, Arnold discloses that the long pendant groups prevent the alignment of polymer chains in solution, thereby improving solubility. Therefore, since structural strength is related to the degree of ordering of the polymers, the Arnold articles teach away from the generation of strong materials. Moreover, in a similar manner to Ringsdorf, Arnold teaches side-chain spacing which is considerably larger than that which would lead to significant increases in material strength.

Several articles by M. Ballauff et al. describe the placement of flexible side chains onto rigid rod polymers. For example, in "Rigid Rod Polymers With Flexible Side Chains, 2. Observation of A Novel Type Of Layered Mesophase," by M. Ballauff and Gunter Friedrich Schmidt, Makromol. Chem., Rapid Commun. 8, 93 (1987), the authors observed, using x-ray diffraction, what they believe is layer formation for polymers having side chains where the number of carbons exceeds eight. They explain this effect by intercalation of side chains as shown in FIG. 3 of the paper. However, the ordering of these side chains, as determined by x-ray diffraction, is weak and short-range since side chains employed are too flexible to order well, and thus to give good compressive strength.

In "New Theories For Smectic And Nematic Liquid-Crystal Polymers: Backbone LCPs And Their Mixtures And Side-Chain LCPs," by F. Dowell, Mol. Cryst. Liq. Cryst. Inc. Nonlin. Opt. 157, 203 (1988), the author developed a first-principles, microscopic, molecular statistical-physics theory to predict and explain static thermodynamic and molecular ordering properties of LCPs in various liquid-crystalline phases and in the isotropic liquid phase. These theories can be used to explain the packing (ordering) of the molecules from the specific chemical structure of the molecules. The theories include segmental intermolecular interactions such as hard repulsions (which influence steric packing), soft repulsions, London dispersion attractions, dipole/dipole forces, dipole/induced-dipole forces, and hydrogen bonding arising on polymer molecules composed of various explicit rigid rodlike and explicit semi-flexible chain sections in backbones or in side chains. Thermodynamic properties [the temperature range of practical uses for LCPs depends upon the thermodynamic properties (including phase stabilities)] and molecular ordering properties can be calculated as a function of temperature, pressure, degree of polymerization, and chemical structure in the LCP molecules. There are no ad hoc or arbitrarily adjustable parameters.

The theory developed in this paper and in earlier papers by Dowell as referenced in this paper have been applied to the identification of molecular characteristics which optimize the two partially conflicting requirements for strong LCPs: namely, molecular order and fluidity. Molecules are chosen by experience and intuition, and the calculations provide the predicted properties. Important characteristics have been found to include the length and shape of the side chains and the backbone repeat units, the number of side chains per repeat unit, the spacing of the side chains along the backbone, the flexibility of the backbone sections and the side-chain sections, and the use of a flexible connecting group between each side chain and the backbone. Specific inputs to the calculations include bond lengths and angles, chain internal trans-gauche rotation energies, site-site Lennard-Jones pair potentials, dipole moments, polarizabilities, hydrogen bonding, etc. for individual atoms and small groups of atoms such as benzene rings and methylene groups in the LCP molecules. Solvent effects can also be predicted and explained utilizing the same approach. (For practical applications, some strong LCPs will require processing from solution.) The calculations have been found to be in good quantitative agreement with existing thermodynamic and molecular order data for known LCPs.

Accordingly, it is an object of the present invention to set forth the significant parameters for the design of liquid-crystalline polymeric compositions of matter having better mechanical properties than existing LCPs.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects in accordance with the purpose of the present invention, as embodied and broadly described herein, the liquid-crystalline polymeric composition of matter hereof comprises a backbone which includes repeat units having at least one substantially rigid structural section and at least one pendant liquid-crystalline side chain attached to a rigid structural section of said backbone, the side chains being spaced apart from other side chains disposed on the same side of the backbone such that the side chains attached to adjacent backbones are substantially interdigitated.

In a further aspect of the present invention, in accordance with its objects and purposes, the liquid-crystalline polymeric composition of matter hereof also comprises a backbone including repeat units having at least one substantially rigid structural section and at least one pendant liquid-crystalline side chain attached to the backbone in between the rigid structural sections of the backbone, the side chains being spaced apart from other side chains disposed on the same side of the backbone such that the side chains attached to adjacent backbones are substantially interdigitated.

Derived benefits and advantages of the present invention include a "cookbook" for designing compositions of matter having improved mechanical properties.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 5a is a schematic representation illustrating the tendency of backbones and side chains designed according to the teachings of the present invention to pack in planes, while FIG. 5c illustrates the packing of one sub-molecular strip of a molecule in one plane, and another sub-molecular strip of the same molecule packing in an adjacent parallel plane.

FIG. 6a shows the molecular chemical structure of an example disc-like section, while FIG. 6b shows a typical group appended thereto.

FIG. 14 is a schematic representation illustrating that the requirement for symmetrical arrangement of the functional chemical groups in the side chains of strong LCPs as shown in FIG. 13 hereof can be relaxed if there are stronger forces between the side chains when they are interdigitated than when they are not. FIG. 14a illustrates dipolar attraction, while

DETAILED DESCRIPTION OF THE INVENTION

Figure 1:
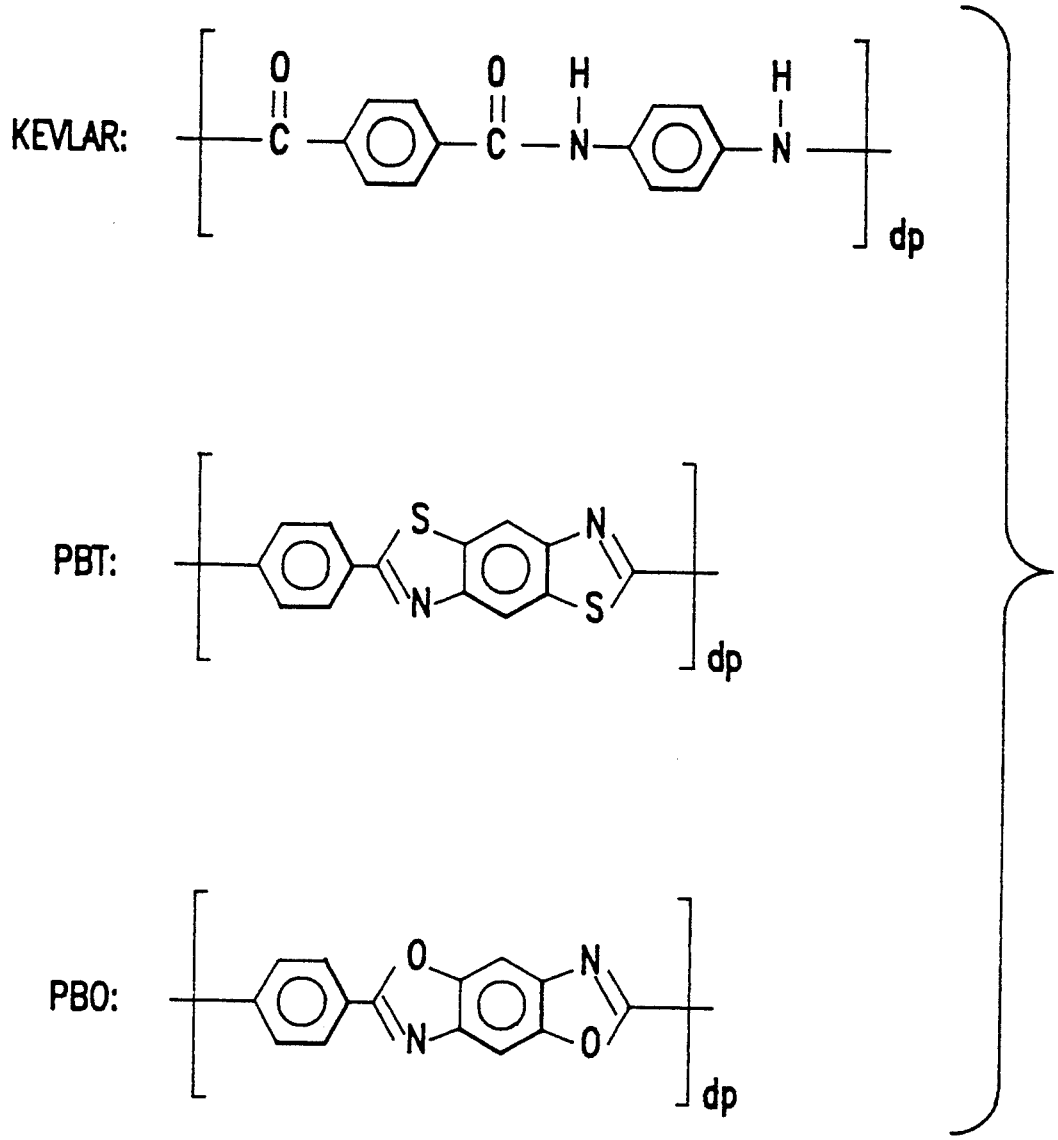
FIG. 1 shows the name abbreviations and molecular chemical structures for three existing backbone LCPs. "dp" represents the degree of polymerization of the backbone repeat unit (i.e., the number of times the backbone repeat unit is repeated to make the backbone).

Briefly, the present invention is a strong composition of matter which includes high-molecular-weight backbone LCPs having LC side chains where the backbones align with other backbones in parallel configuration, while the LC side chains align with other side chains in the directions perpendicular to the backbones. The theory of the inventor of the subject invention predicts that increasing the three-dimensional LC ordering of the polymer molecules increases the compressive strength and other mechanical properties in directions transverse to the LCP backbone and also increases the tensile strength and tensile modulus of the LCP. The physical interdigitation of the side chains of one polymer molecule with those of other polymer molecules is responsible for the expected improvements in structural properties in three-dimensions of the resulting material. Present LCPs, such as Kevlar, have one-dimensional strength. The compositions of matter of the present invention, by contrast, are calculated to have significant strength in three-dimensions on a microscopic, molecular level. Moreover, it is expected that the LC ordering of the backbones of the LCPs of my invention will enhance the ordering of the side chains and vice versa. Therefore, it is expected that my LCPs will have improved tensile strength and modulus over present backbone LCPs, as well as excellent compressive strength. It is further expected that the compositions of matter of my invention will be useful for generating LCP thin films and LCP bulk materials in addition to LCP fibers.

It is known that increasing the LC ordering of the backbones (and thus increasing the tensile strength and modulus) of present backbone LCPs generally increases the melting temperature and decreases the solubility. For example, Kevlar is processed in concentrated sulfuric acid. Increases in molecular ordering render more difficult the physical processing (spinning, forming, etc.) of the polymer in an LC phase (either in solution or in the melt) before solidification of the polymer for its final use. By contrast, the side chains in the compositions according to teachings of the present invention, are predicted to improve the solubility of the backbones. The side chains are soluble in many of the same solvents in which low-molecular-weight (monomeric) LC molecules are soluble. The solubility of the side chains in these solvents thus increases the solubility of the entire molecule (including the backbone) in these solvents.

As stated hereinabove, in "New Theories For Smectic And Nematic Liquid-Crystal Polymers: Backbone LCPs And Their Mixtures And Side-Chain LCPs," by F. Dowell, Mol. Cryst. Liq. Cryst. Inc. Nonlin. Opt. 157, 203 (1988), the author developed a first-principles, microscopic, molecular statistical-physics theory to predict and explain static thermodynamic and molecular ordering properties of LCPs in various liquid-crystalline phases and in the isotropic liquid phase. These theories can be used to explain the packing (ordering) of the molecules from the specific chemical structure of the molecules and have been extended to the problem of the design of strong polymeric species as follows. The chemical structure of each molecule is divided into a sequence of connected sites, where these sites correspond to small groups of atoms such as methylene ($-CH_2-$) groups. The multi-site packing and interactions of the molecules in the system can then be theoretically investigated.

The present theory defines a rigid section as one formed by a sequence of conjugated aromatic rings, double bonds, and triple bonds in the molecule. Conjugated means that the aromatic rings, double bonds, and triple bonds are not separated by more than one single bond. The overlap of $\pi$ orbitals in the section leads to its rigidity. A semiflexible section is usually formed by an n-alkyl $[-(CH_2)_x-]$ chain section. Such a section is partially flexible (semiflexible) since rotations are readily achievable about any carbon-carbon bond between methylene groups in a given chain section.

The theory permits partial orientational ordering of the long axes of the molecules parallel to a preferred axis and permits partial positional ordering of the centers of mass of the molecules into layers. In positional ordering, oriented rigid sections pack with other rigid sections, and associated semiflexible sections pack with other semiflexible sections. Molecular packing is accomplished mathematically using lattice combinatorial statistics to determine the analytic partition function for the system. Various continuum limits are taken in this theory. The partition function and the resulting equations for static thermodynamic and molecular ordering properties are functions of pressure, temperature, and the details of the molecular chemical structures. Each interaction in the theory depends explicitly on the intramolecular and intermolecular orientational and positional orderings of the specific molecular sites involved in the interaction. There are no ad hoc or arbitrarily adjustable parameters. All variables used are taken from experimental data for atoms or small groups of atoms, or are calculated in the theory.

Basically, a test molecule having a chosen chemical structure is introduced into a system of other molecules having chosen orientations and positions of the various parts thereof, and the ways in which the test molecule can be packed into the system are counted and the site-site intermolecular interaction energies totaled for each orientation and position, yielding the partition function for the system. In practice, the density and the independent average orientational and position order variables for the different parts of the molecule are determined at a given pressure and temperature by simultaneously solving the equation of state for the system and the equations which minimize the Gibbs free energy with respect to these average orientational and positional order variables. These equations are derived from the partition function. The dependent average order variables and the other thermodynamic properties of the system are then calculated. Some of the competing interactions explicitly calculated in the theory are packing of rigid versus semiflexible sections, entropic effects (that is, disorder from different chain rotations and different ways to pack the molecules) versus energetic effects (energies of different chain rotational minima and of attractive and soft repulsive forces), and repulsive forces versus attractive forces. The density and the orientational and positional orderings are coupled through the intramolecular and intermolecular packing and interactions of the different parts of the molecules.

Figure 2A:
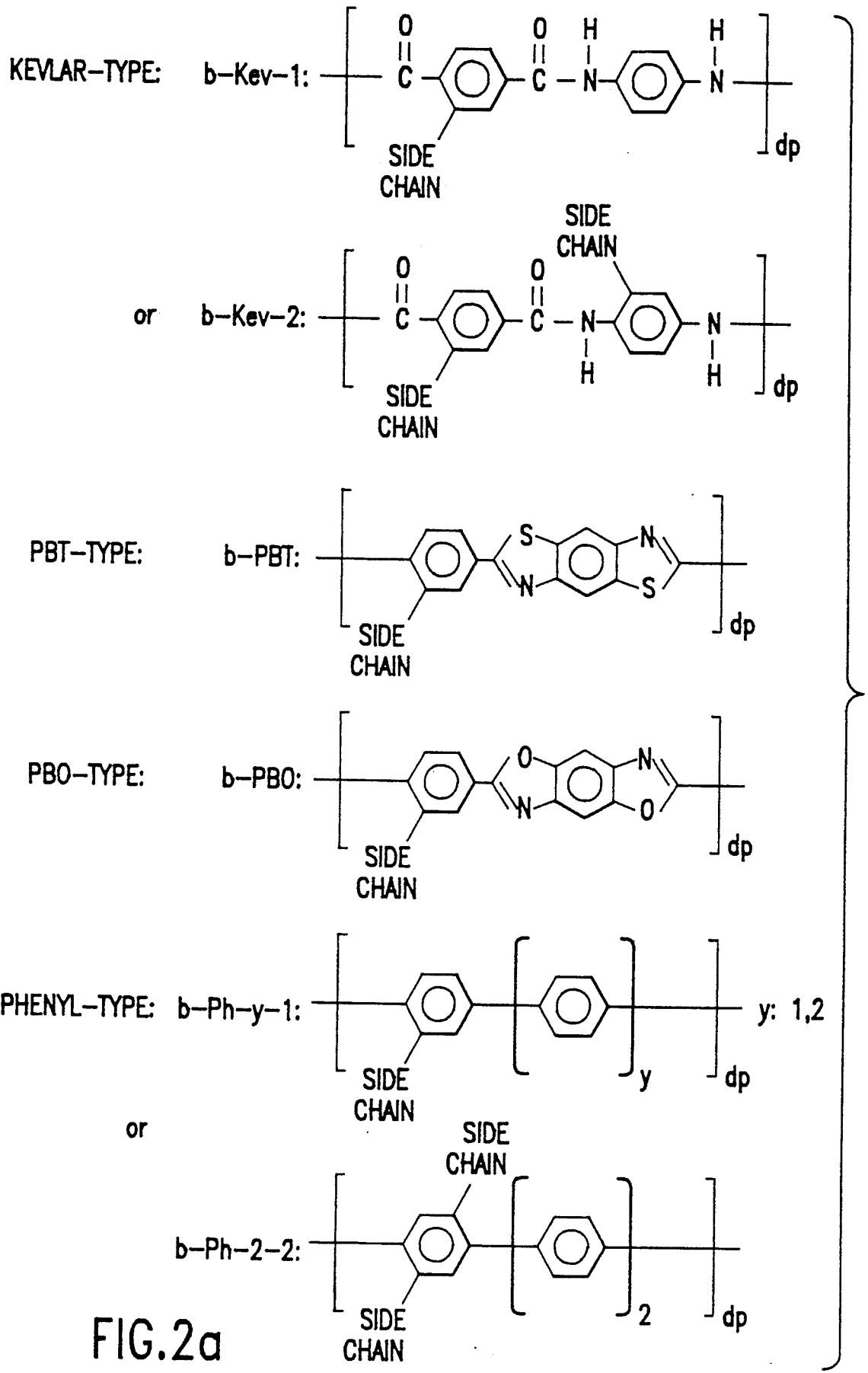
FIG. 2 shows the name abbreviations and molecular chemical structures for the LCP backbones (FIG. 2a) and LC side chains (FIG. 2b–2d) which, when combined according to the teachings of the present invention form strong compositions.
Figure 2B:
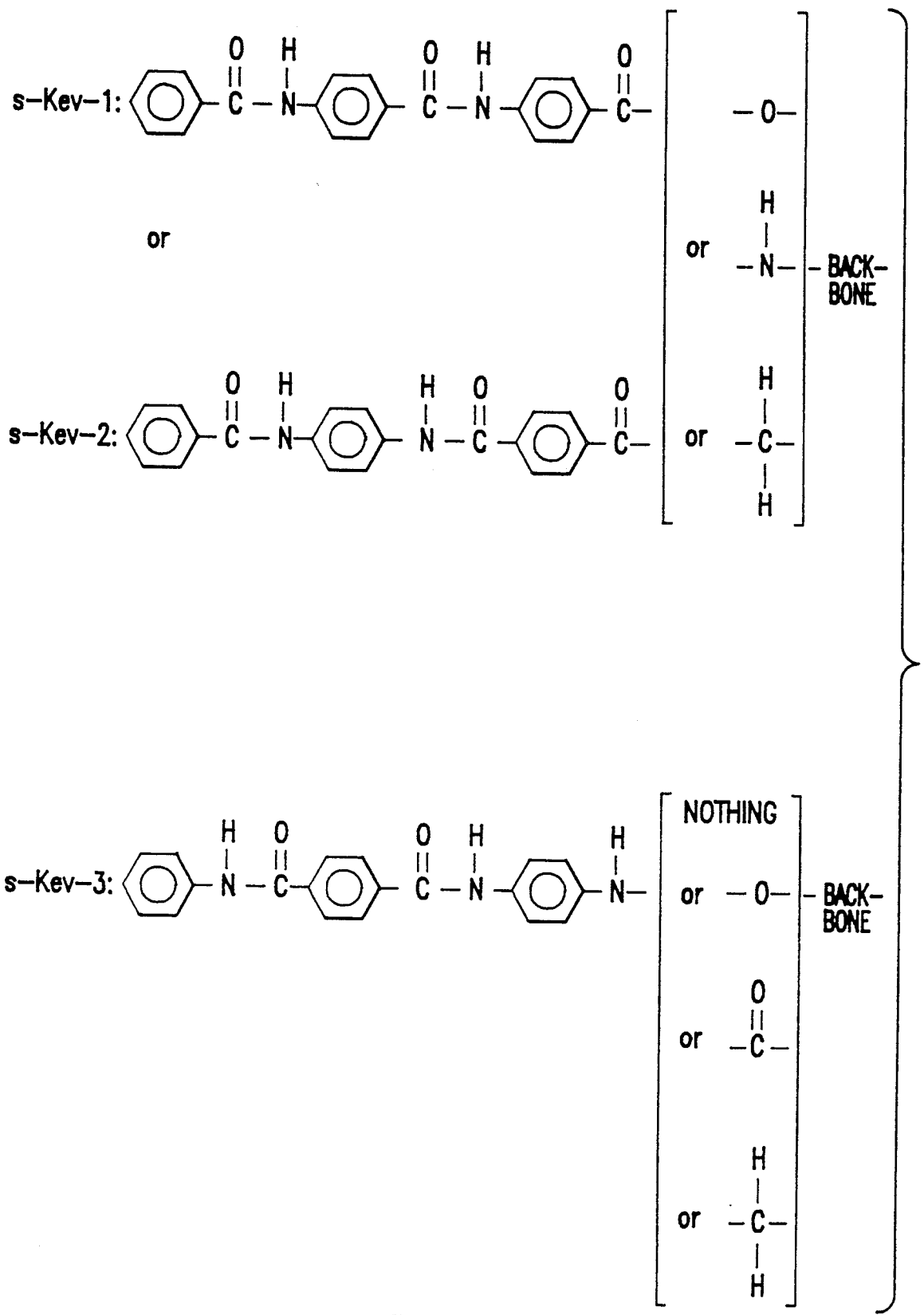
Figure 2C:
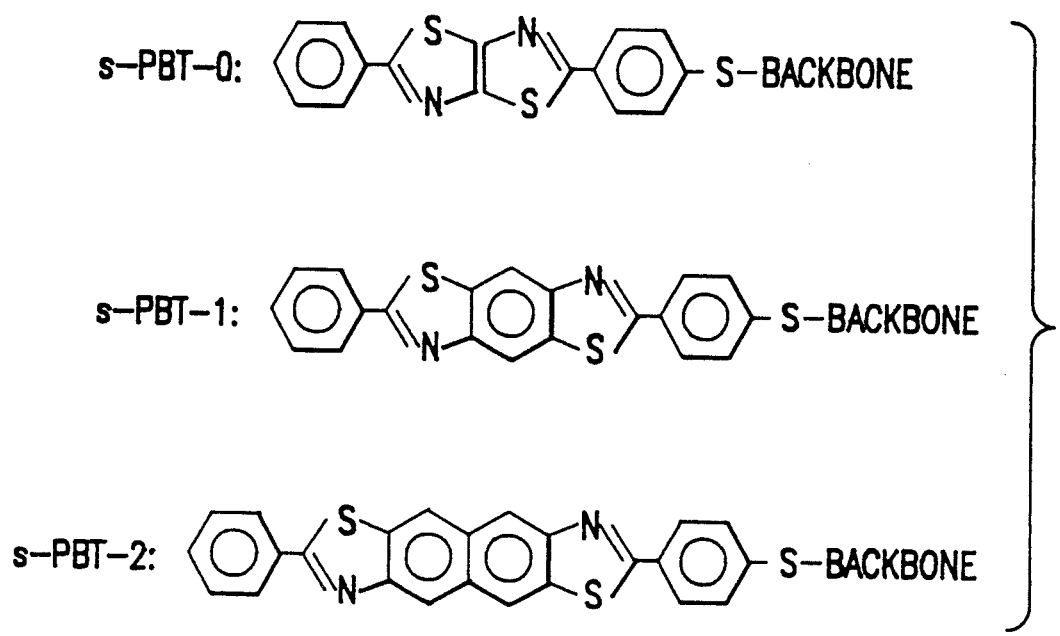
Figure 2D:
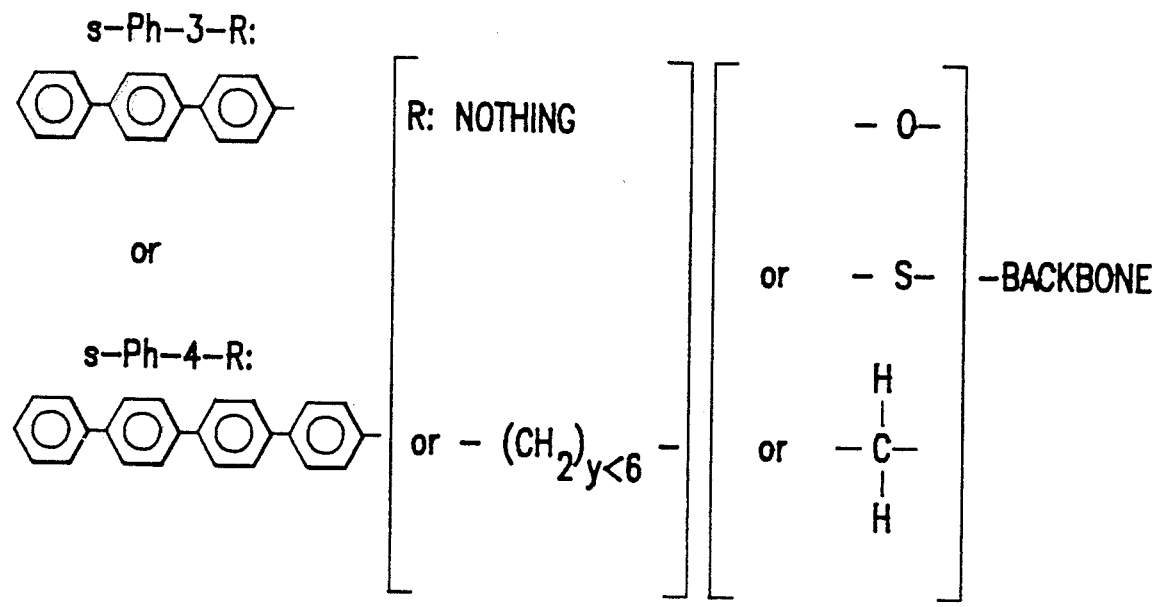
Figure 3:
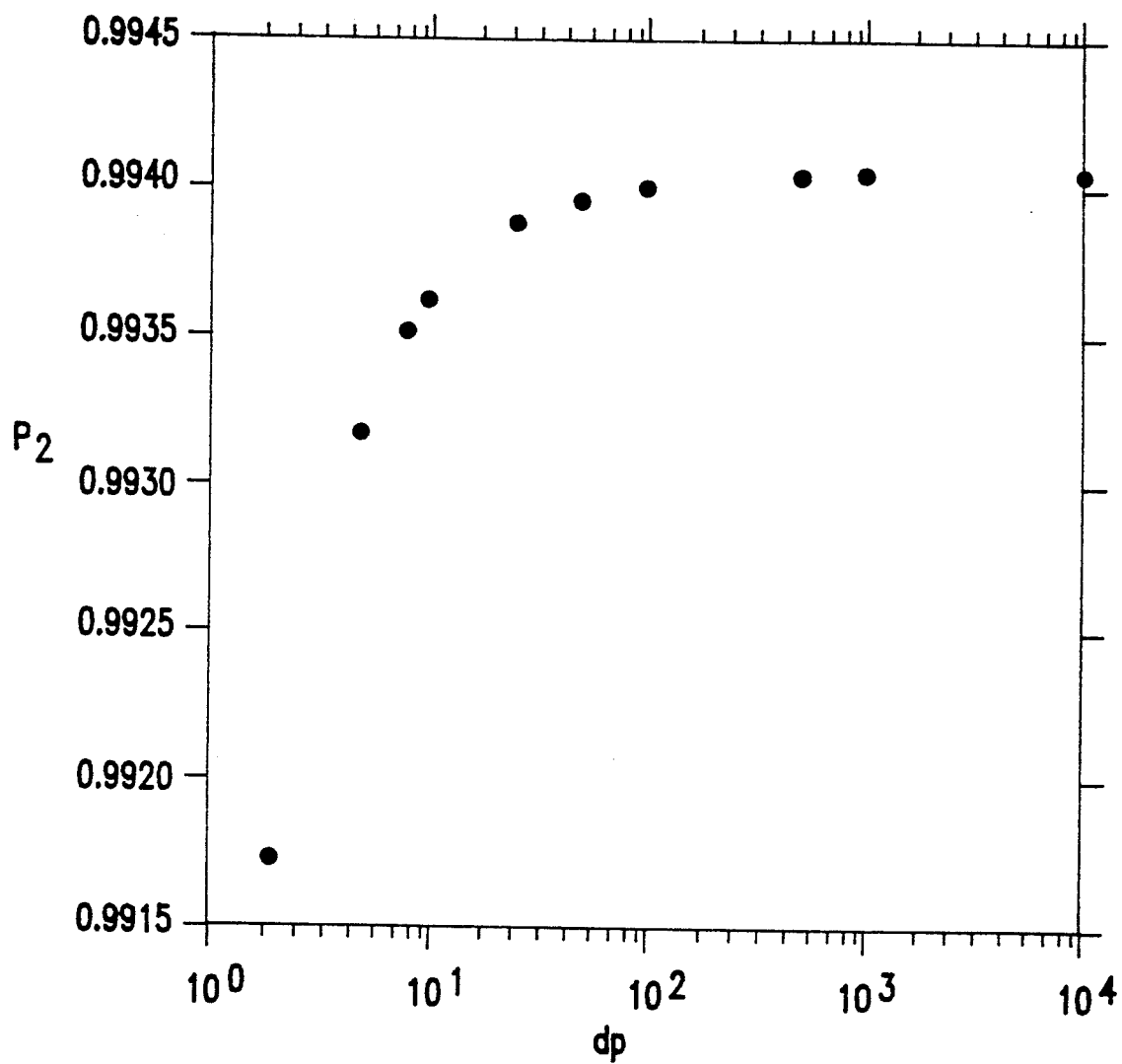
FIG. 3 shows a plot of the average orientational order variable $P_2$ versus the degree of polymerization dp at a temperature of 600° K. for the backbones for the theoretically-designed strong LCP b-Kev-1/s-Kev-1 [NH] (See FIGS. 2a and 2b hereof) at a pressure of 1 atm.

As mentioned, the present invention includes high-molecular-weight molecules having LCP backbones and LC side chains where the backbones can align with other backbones in a parallel fashion and the LC side chains can align with other side chains in directions substantially perpendicular to the backbones. Reference will now be made in detail to the present preferred embodiments of the invention, examples of which are illustrated in the accompanying drawings. FIG. 1 shows the name abbreviations and molecular chemical structures for three existing backbone LCPs. FIGS. 2a–2d illustrate examples of the backbone chemical structures and the side-chain chemical structures designed according to the teachings of my invention. FIG. 2a describes the backbones with name abbreviations, and FIGS. 2b–2d describe the side chains with name abbreviations therefor. It would be apparent to one having ordinary skill in the art of liquid-crystal polymers, after reading the present disclosure, that strong liquid-crystal polymer could be designed from backbones and side chains which are variations of the backbone LCPs which include the chemical structures of polyacetylenes, polyazobenzenes, polyazoxybenzenes, polyethers, and polyesters. As in existing backbone LCPs, the bonding of atoms in very long chains (polymer backbones) continues to make a significant contribution to the tensile strength of the strong LCPs designed according to the present invention, and the ordering of these backbones continues to increase both the tensile strength and the tensile modulus thereof. As in conventional polymeric materials, then, high molecular weight of the chains is essential for good mechanical properties. This fact is illustrated in FIG. 3 which shows the relationship between the average orientational order $P_2$ of the rigid sections in the repeat units of the strong LCP, b-Kev-1/s-Kev-1 [NH], as a function of the degree of polymerization, dp. Here, and in what follows hereinbelow, the abbreviation of the backbone structure is set forth before the slash, while that for the side chain follows the slash, and backbone and side-chain abbreviations are defined in FIGS. 2a–2d hereof. The degree of polymerization is the number of times the repeat unit of the backbone is repeated in the backbone of the polymer. $P_2$ can vary from 0 to 1, with 0 indicating no ordering, while 1 indicates complete ordering. As is readily observed from FIG. 3, $P_2$ increases rapidly as dp increases, reaching the asymptotic region when dp is about 1000. $P_2$ is rapidly approaching the asymptotic region for dp of 100 or even 10. It is important to note that the theory predicts that relatively small changes in $P_2$ as a function of dp are accompanied by much larger changes in other properties including thermodynamic as well as mechanical properties.

Figure 4:
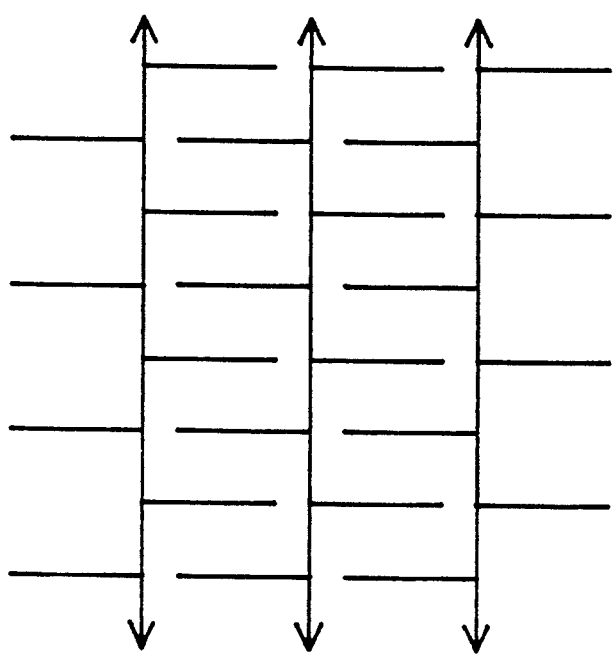
FIG. 4 is a schematic representation of physical interdigitation of side chains in strong LCP compositions.

The physical interdigitation of the side chains of one polymer molecule with the side chains of other polymer molecules as shown in FIG. 4 is the key feature responsible for the good compressive strength of the strong LCPs designed according to the teachings of the present invention. As a LCP sample is compressed, the physically interdigitated side chains will be pushed close together and will begin to repel each other, thereby keeping the associated backbones from being slipped past each other. Moreover, the interdigitation assists in the prevention of the backbones from being separated from one another. Ordering of the backbones will also enhance ordering of the side chains, and vice versa. Thus, the LCPs of the present invention will have both excellent compressive strength and considerably greater tensile strength and modulus than present backbone LCPs. Tables I and II illustrate the predicted effect of increased orientational ordering of the backbones and the side chains, respectively, of several LCPs designed according to the teachings of the present invention over the orientational ordering of existing backbone LCPs.

TABLE I

| Molecule | 300K | 450K | 600K |
|---|---|---|---|
| Existing Backbone LCPs: | | | |
| Kevlar | 0.95619 | 0.89206 | 0.81439 |
| PBO | 0.97329 | 0.92349 | 0.85935 |
| Strong Combined LCPs According to the Teachings of the Present Invention: | | | |
| b-Kev-1/s-Kev-1 [NH] | 0.99918 | 0.99696 | 0.99404 |
| b-Kev-1/s-PBT-0 | 1.00000 | 1.00000 | 1.00000 |
| b-PBO/s-PBO-1 | 1.00000 | 1.00000 | 1.00000 |

TABLE II

| Molecule | 300K | 450K | 600K |
|---|---|---|---|
| b-Kev-1/s-Kev-1 [NH] | 0.63227 | 0.61398 | 0.60474 |
| b-Kev-1/s-PBT-0 | 0.50663 | 0.50662 | 0.50662 |
| b-PBO/s-PBO-1 | 0.50794 | 0.50792 | 0.50791 |

In Table II, $P_2$ is the arithmetic average of $P_2$ for the packing of side chains of a molecule with the non-interdigitated side chains of other molecules, and $P_2$ for the packing of side chains of a molecule with side chains of the same molecule or with the interdigitated side chains of other molecules. It should be noted at this point that backbone LCPs have no side chains, and thus no ordering of side chains. Calculations for both tables were performed for three temperatures, for a pressure of 1 atm., and for a degree of polymerization, dp, of 1000.

Figure 5A:
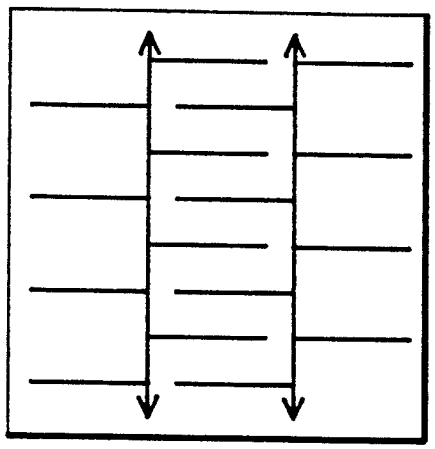
Figure 5B:
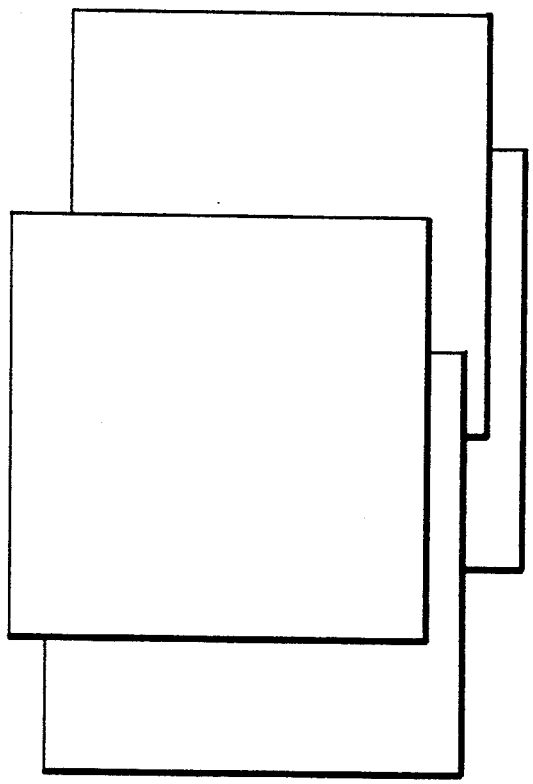
FIG. 5b shows that such planes can orient such that the backbones in one plane align with the backbones in other planes and such that side chains in this plane align with the side chains in other planes.

One of the essential features of the present invention is that increased strength is three-dimensional on a microscopic molecular level, in contrast to backbone LCPs which have one-dimensional strength. Calculations for b-Kev-1/s-Kev-1 [NH] at T=450K yield an increase in tensile strength of 25 GPa, an increase in tensile modulus of 1539 GPa, and an increase in compressive strength of 25 GPa over Kevlar. These increases constitute upper bounds possible at this temperature. The better the processing of the LCP, then the closer one comes to achieving these values. Similar increases are expected for other materials designed according to the teachings of my invention. For comparison, experimentally determined "as processed" ranges of mechanical properties for Kevlar, PBT, and PBO are: 3.5–5.8 GPa for tensile strength, 130–365 GPa for tensile modulus, and 0.40–0.48 GPa for compressive strength [See, e.g., W. W. Adams and R. K. Eby, MRS Bulletin 12, (8) 22 (1987).]. Therefore, the LCPs of this invention may be used not only to make fibers, but also to make thin films and bulk materials. Theoretical calculations show that the backbones and side chains of strong LCPs tend to pack in planes. Each plane tends to orient parallel to other planes, such that backbones in one plane align with backbones in other planes, and such that side chains in one plane align with side chains in other planes. This packing is shown in FIGS. 5a and 5b. Further, one sub-molecular strip of a molecule can pack in one plane, and another sub-molecular strip of the same molecule can pack in an adjacent parallel plane, as is shown in FIG. 5c hereof.

Having generally described the invention, the following specific examples are given as a further illustration thereof.

EXAMPLE I

Rigid Sections in Backbones and Side Chains

The repeat unit of the backbone should contain at least one rigid section (that is, a section where there is little, if any, rotation about bonds between atoms). It is especially important that each side chain in the repeat unit should contain at least one rigid section. For best mechanical properties, these rigid sections should be at least 15 A long. Rigid sections shorter than 15 A can give good mechanical properties if the rigid sections contain strong dipolar groups and/or strong hydrogen-bonding groups which increase the attractions between rigid sections, thereby pulling the molecules closer together and thus increasing the orientational alignment. Rigid sections can be as short as 8 A, but these shorter sections in general lead to smaller increases in mechanical properties. If the backbone is completely rigid, as in the PBT or PBO backbones shown in FIGS. 1 and 2a, the rigid section of the repeat unit of the backbone can also be shorter than 15 A and still have good mechanical properties, since the effective rigid section is the length of the entire backbone. In fact, the rigid section of the repeat unit occupies the entire length of the repeat unit and has a calculated length of 12.28 A for PBT and PBO backbones. This length is in very good agreement with the experimental value of 12.35 A from x-ray measurements on PBT. As in existing LCPs, rigid sections in the strong LCPs of the subject invention should contain benzene or other aromatic rings including heterocyclic rings, and/or other functional groups with double and triple bonds such as $-N=N-$. The groups employed should be conjugated (not separated by more than one single bond), since it is the overlap of $\pi$ orbitals which is the origin of the rigidity of such sections. Gaps not larger than several bonds are not too deleterious to mechanical properties if there are dipolar groups and/or hydrogen-bonding groups, such as NH or $C=O$, whose forces help hold the entire section rigid, as in Kevlar. The calculated length of the repeat unit in Kevlar backbones is 12.74 A.

Figure 7A:
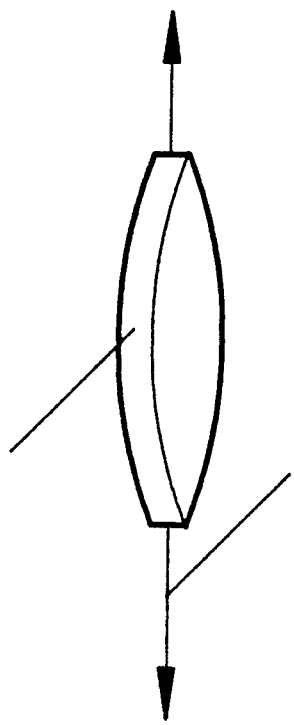
FIG. 7a is a schematic representation of a disc-like section inserted in the long axis of a backbone.
Figure 7B:
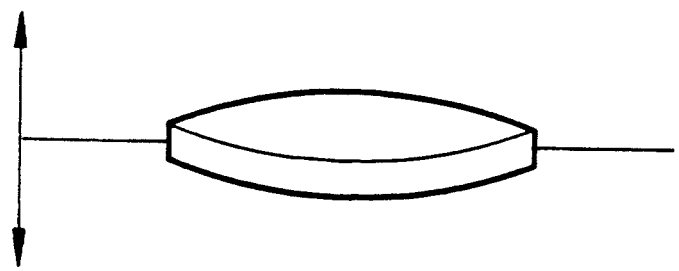
FIG. 7b illustrates a disc-like section inserted in the long axis of a side chain.

Rigid sections in backbones and side chains can be either rod-like or disc-like (as illustrated in FIG. 6 hereof), but rod-like sections will pack and order better. Best mechanical properties will result if the plane of the disc lies along the long axis of the backbone or side chain as shown schematically in FIG. 7a and 7b.

EXAMPLE II

Degree of Polymerization

For best mechanical properties, the average degree of polymerization, dp, should be at least 10 or more—and preferably 50 to 100 or more—repeat units, depending on the size of the repeat unit. That is, the smaller the repeat unit, the greater the degree of polymerization required to achieve a sufficient number of connected atoms in the polymer backbone for good mechanical properties. Review FIG. 3 hereof as an example of the importance of larger values of dp in attaining more complete orientational order.

EXAMPLE III

Length of Side Chain

For best compressive strength, each side chain should have at least one long rigid section. In practice, side chains longer than 50–60 A will be more difficult to orient under dynamic processing conditions, due to the length of these side chains. Tables III and IV show that the average orientational ordering $P_2$ of the backbones and the side chains, respectively, increases as the length of the rigid section in the side chain increases.

TABLE III

| Side-Chain y | $P_2$ |
| --- | --- |
| 2 | 0.97013 |
| 3 | 0.99554 |
| 4 | 0.99939 |

TABLE IV

| Side-Chain y | $P_2$ |
| --- | --- |
| 2 | 0.54482 |
| 3 | 0.58945 |
| 4 | 0.63884 |

Figure 8:
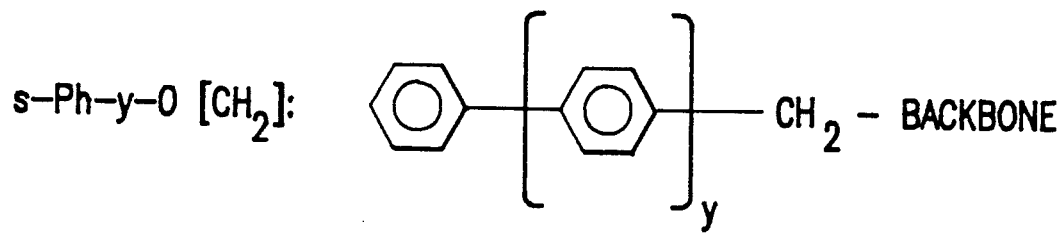
FIG. 8 shows the name abbreviation and molecular chemical structure for an additional side chain in some strong LCPs according to the teachings of my invention.

Calculations were performed for b-Ph-2-1/s-Ph-y-0 [CH$_2$], designed according to the teachings of the present invention, for a temperature of 450K, a dp of 1000, and a pressure of 1 atm. Note that b-Ph-2-1 is illustrated in FIG. 2a, while s-Ph-Y-0 [CH$_2$] is illustrated in FIG. 8 hereof. The backbone repeat unit has a calculated length of 12.96 A, and the side chain s-Ph-2-0 [CH$_2$] has a calculated length of 15.83 A. Each additional phenyl group in the side chains s-Ph-y-0 [CH$_2$] adds 4.32 A to the calculated length of s-Ph-2-0 [CH$_2$]. For comparison, the calculated lengths for the backbone repeat units and side chains for the molecules listed in Tables I and II are 12.74 A for b-Kev-1 and 12.28 A for b-PBO, and 20.74 A for s-Kev-1 [NH], 14.89 A for s-PBT-0, and 16.45 A for s-PBO-1.

EXAMPLE IV

Spacing Distance between Side Chains along Backbone

Figure 9:
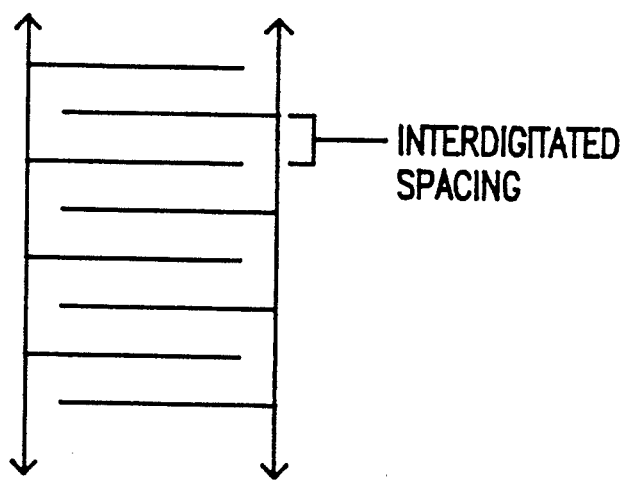
FIG. 9 is a schematic representation of the spacing between interdigitated side chains in a strong LCP.
Figure 10:
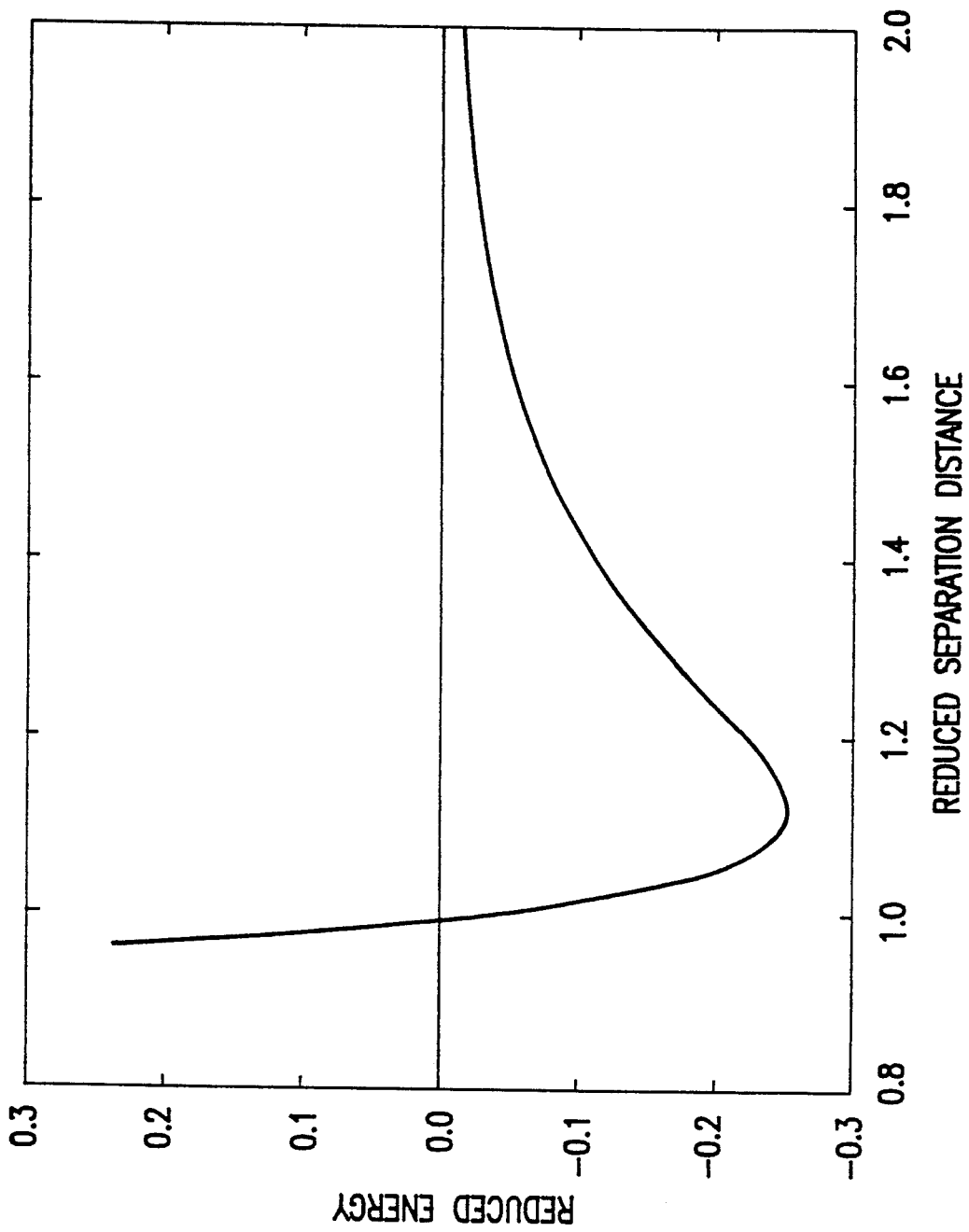
FIG. 10 shows a plot of a quantity proportional to the energy versus reduced separation distance between centers of directly adjacent molecular segments in directly adjacent side chains in strong LCPs under a Lennard-Jones potential. The reduced separation distance is the actual separation distance (in A) divided by 4A.

The spacing distance between the side chains along the backbone is a critical factor in determining compressive strength in strong LCPs. For best compressive strength, the spacing between two side chains should be such that the side chain of another molecule can interdigitate between these two side chains with separation distances of between 4 and 5 A between the centers of directly adjacent side chains. FIG. 9 schematically illustrates what is meant by interdigitated spacing. The above conclusion derives from a consideration of the curve shown in FIG. 10 hereof. Therein, a quantity proportional to the Lennard-Jones potential energy is plotted as a function of separation distance. To obtain the actual abscissa in Angstrom units, multiply the numbers presented by 4 A. According to this plot, 4.5 A is the approximate average separation distance between centers of nearest-neighbor molecular segments at the minimum in the potential energy between the two segments. (This is the location where the attractive dispersion interactions maximize.) The conclusion that this spacing represents the optimum spacing between adjacent side chains is supported by the experimental observations that the spacing between adjacent backbones in backbone LCPs (and between adjacent molecules in low-molecular-weight LC molecules) is between 4 and 5 A. For separation distances between the centers of adjacent interdigitated side chains greater than about 4.5 A, the orientational alignment of the side chains (and thus compressive strength of the LCP) will decrease as the separation distances increase. If the spacing between centers of adjacent side chains becomes too large along the backbone in combined LCPs, the side chains will decrease the orientational ordering (and thus the tensile strength and tensile modulus) of the backbones and there will also be no significant increase in the compressive strength as compared with backbone LCPs.

As mentioned hereinabove, the combined LCPs of Ringsdorf and Arnold are not strong LCP compositions of matter according to the teachings of my invention primarily because the spacings between side chains thereof are too large. It should be noted that the $\pi$ bonding between aromatic rings in planar groups or disc-shaped sections on adjacent side chains will cause these sections to pack in stacks such that the minimum separation distance between the centers of these planes or discs can be as small as 4–5 A as long as the spacing of the side chains along the backbone does not force larger separation distances.

Additionally, for best uniformity in compressive strength, the side chains should be spaced as regularly as their points of attachment to the backbone permit, since such regularity of spacing promotes regularity of interdigitation of the side chains from different molecules, thus promoting uniform compressive strengths on the sub-molecule level.

Figure 11:
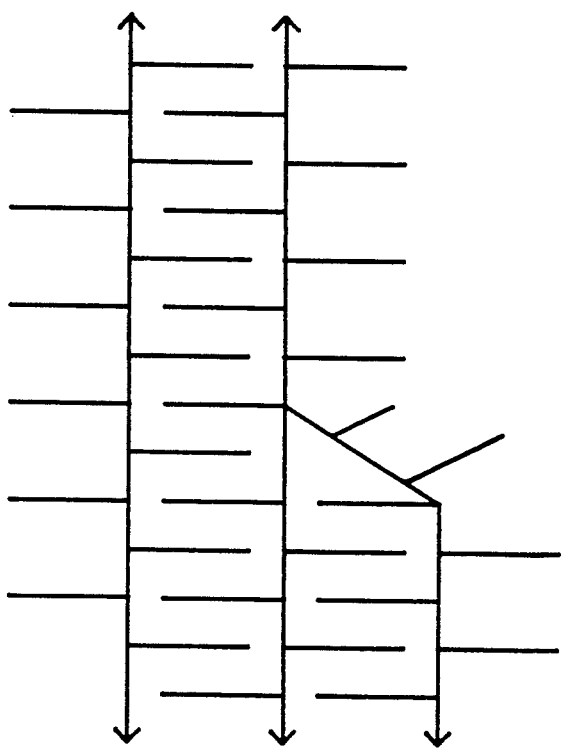
FIG. 11 is a schematic representation of a strong LCP molecule having its side chains interdigitated with the side chains of a second strong LCP molecule for a length along the backbone, and then with the side chains of a third strong LCP for another sub-molecular portion, and so forth.

Finally, it is not necessary for the side chains of one molecule to interdigitate only with the side chains of one other molecule. FIG. 11 illustrates that the side chains of one molecule can interdigitate with the side chains of a second molecule for a length along the backbone, then interdigitate with the side chains of a third backbone for another sub-molecular strip along the backbone, and so forth. For best tensile strength and tensile modulus, there must still be good orientational alignment of neighboring backbones in the system. The interdigitation of one molecule with the side chains of several other molecules gives rise to an effective long-range three-dimensional ordering of the side chains and thus to long-range compressive strength in the LCP composition. For best compressive strength, the sub-molecular strip of interdigitation of the side chains of one molecule with the side chains of another molecule should be long enough so as to include at least 3 or 4 side chains from each molecule. Short-range correlations between one molecular segment and segments on neighboring molecules (in this case, between molecular segments in different side chains) persist out to third neighbors, especially if the separation distances between the centers of nearest neighbors are between 4 and 5 A. The recommendation for at least 3 or 4 side chains from each strong LCP molecule (designed according to the teachings of the present invention) in the sub-molecular strip of interdigitation gives at least about 3 neighbors in each direction—along the backbone—from the center of the sub-molecular strip. Such correlations between side chains in a sub-molecular strip of interdigitation add to the orientational alignment of the side chains and assist in increasing the compressive strength of the LCP compositions.

EXAMPLE V

Side Chains on One or Two Sides of Backbone

Figure 12A:
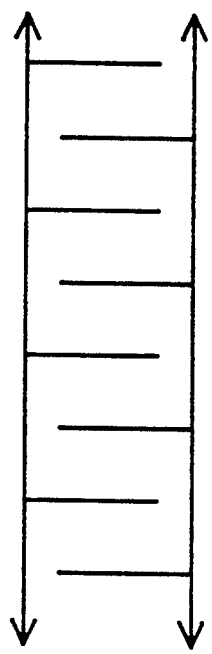
FIG. 12 is a schematic representation of side chains of a strong LCP packing on the same side of the backbone (FIG. 12a) or packing on alternating opposite sides of the backbone (FIG. 12b).
Figure 12B:
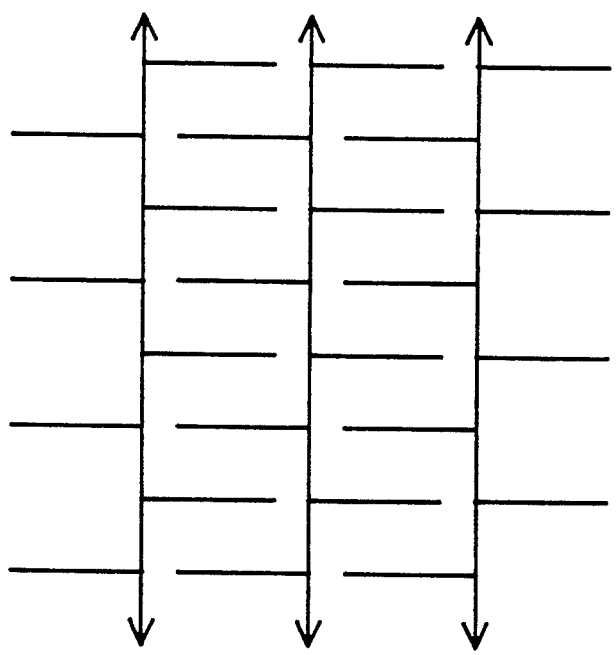

FIGS. 12a and 12b are schematic representations of the packing of strong LCP molecules designed according to the teachings of the present invention on the same side of the backbone or alternatively on opposite sides of the backbone, respectively, as long as the distances between side chains on the same side and the regularity of side-chain spacing on the same side meet the requirements set forth hereinabove. (Packing in parallel planes occurs whether the side chains pack on the same side or on both sides of the backbone.) For the calculations reported in Tables I–IV and FIG. 3, the side chains of a molecule interdigitate on the same side of the backbone with the side chains of a neighboring molecule for b-Kev-1/s-Kev-1 [NH] and b-Ph-2-1/s-Ph-y-0 [CH$_2$] (where y=2), b-Kev-1/s-PBT-O and b-PBO/s-PBO-1 while the side chains of a molecule interdigitate on alternating sides of the backbone with the side chains of neighboring molecules for b-Kev-2/s-Kev-1[NH] and b-Kev-2/s-PBT-O. In both types of packing, there is virtually complete interdigitation of the side chains, and there is virtually complete local one-dimensional positional ordering of the side chains one with another.

With a completely rigid backbone, side chains can be made to pack on the same side or on alternating sides of the backbone by chemically attaching the side chains to the appropriate sides of the backbone. If there is some possibility of rotation in or between rigid sections of a backbone, packing can occur on both sides of the backbone with either regular or irregular spacing. It is possible to use external forces such as electrical, mechanical, or magnetic forces in the processing steps to assist in moving all of the side chains to one side of the backbone. However, for these backbones with rotations, the easiest and most effective way to encourage the proper spacing distances between side chains and the regular spacing of side chains is to set the frequency of side chains along the backbone high enough such that the side chains of the molecule will be too close together—especially when interdigitating between the side chains of other molecules—unless the side chains of the molecule alternate from one side of the backbone to the other. See, for example the backbone structure b-Kev-2 in FIG. 2a.

EXAMPLE VI

Symmetry of Side Chains

Figure 13:
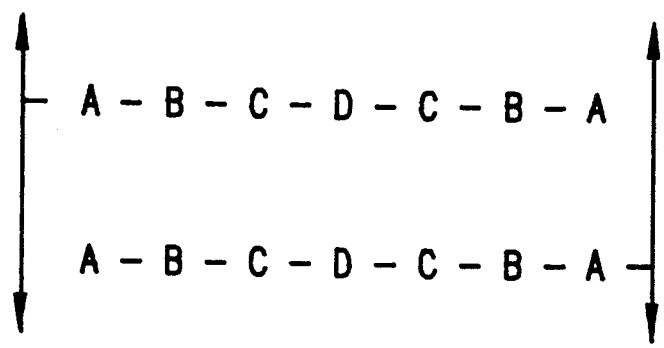
FIG. 13 is a schematic representation illustrating that a symmetrical arrangement of functional chemical groups in the side chains gives rise to a maximum overlap (interdigitation) of these side chains in strong LCPs.
Figure 14A:
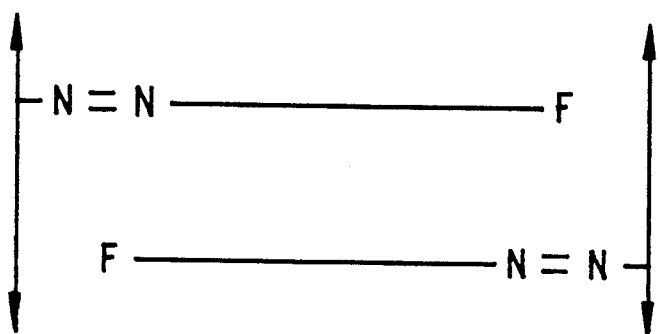
Figure 14B:
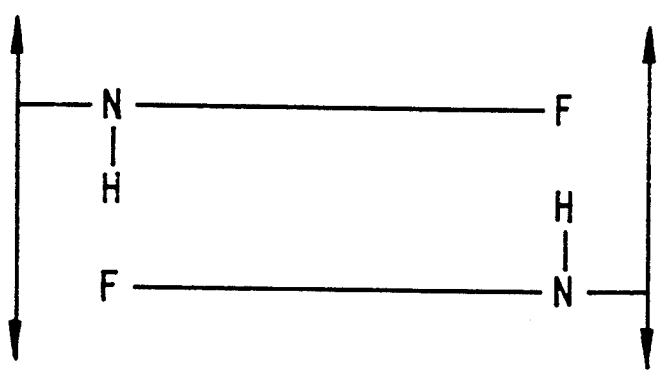
FIG. 14b shows hydrogen bonding forces.

In general, side chains should be as symmetrical as possible with regard to the sequences of functional chemical groups from one end of the side chain to the other end thereof, as schematically illustrated in FIG. 13 hereof, in order to obtain maximum overlap of the side chains in the interdigitated state. The better this overlap, the better the alignment of the side chains, and thus the better the compressive strength of the strong LCPs. This symmetry requirement may be relaxed if there are strong forces, such as dipolar or hydrogen-bonding forces, between the side chains when they are interdigitation, especially if these forces are stronger with interdigitation than without interdigitation. FIGS. 14a and 14b schematically show two examples of the situation where there are strong dipolar forces and/or hydrogen-bonding forces between the opposite ends of the side chains. The strong LCP b-Kev-1/s-Kev-1 [NH], designed according to the teachings of the present disclosure and described in Tables I and II and in FIG. 3 hereof, is an example of the partial relaxation of the side-chain symmetry requirement due to stronger hydrogen bonding between the side chains when they are interdigitated.

EXAMPLE VII

Semiflexible Sections in Backbone and Side Chains

Semiflexible sections can be used in both backbones and side chains of strong LCPs. Semiflexible sections are sections of atoms and functional chemical groups having only single bonds, about which rotations can occur in temperature ranges of interest. The —(CH$_2$)$_x$— sequence is the most common example of such a semiflexible section. Semiflexible sections self-align less than rigid sections, and thus require more added external (such as mechanical) effort—than do rigid sections—to align them in the processing stage to achieve good mechanical properties.

For best mechanical properties, each semiflexible section would be short enough that the section cannot bend back on itself. As an example, for the —(CH$_2$)$_x$— chains, x should not exceed 6. It takes less external effort to align a semiflexible section if the section is short enough that it cannot bend back on itself.

Often, semiflexible sections are more soluble in common solvents (many of which are chain molecules, quasi-spherical molecules, or other small molecules) than are most rigid sections. These common solvent molecules tend to disrupt the ordering of the rigid sections and thus tend to be expelled by these sections. In contrast, semiflexible sections tend to pack well with (i.e., tend to bend and twist well around) these common solvent molecules. These predictions are consistent with experimental results for backbone LCPs and for low-molecular-weight LC materials. Thus semiflexible sections enable easier processing in common, inexpensive solvents. It is also known that semiflexible sections and slightly nonlinear rigid sections tend to disrupt somewhat the ordering of linear rigid sections and can thus lower the transition temperatures below the temperature of the onset of chemical decomposition. The inclusion of such sections therefore leads to backbone LCPs that can be processed from the melt. By analogy, semiflexible sections or slightly nonlinear rigid sections may be added to the LCPs of the present invention in order to trade off some strength in exchange for melt-processability.

EXAMPLE VIII

Points of Attachment of Side Chains to Backbone

Side Chains can be attached to the backbone at points in either the rigid or the semiflexible sections of the backbone, with the condition that the point of attachment is such that there is no steric hindrance in attaching the side chain at that point. That is, the side chain must be able to fit into the backbone chemical structure at that point. For rigid sections containing aromatic rings, there is in general less chance of steric hindrance if a side chain is attached to a side of the ring rather than to smaller groups such as a nitrogen atom located between these rings in the backbone. A review of some of the structures in FIG. 2a hereof will illustrate this point.

EXAMPLE IX

Chemical Group Connecting Side Chain to Backbone

Figure 15A:
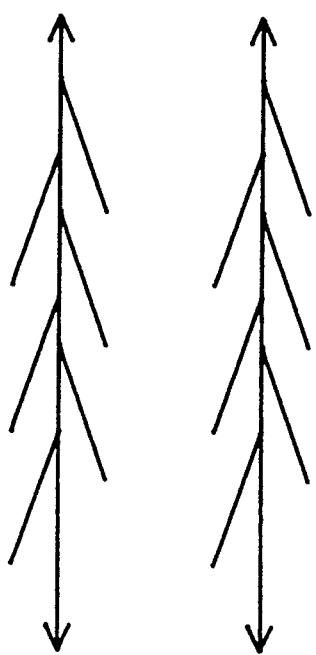
FIG. 15a is a schematic representation of strong LCPs when the side chains are folded down somewhat parallel to the backbone when linear processing is required to fabricate an article.
Figure 15B:
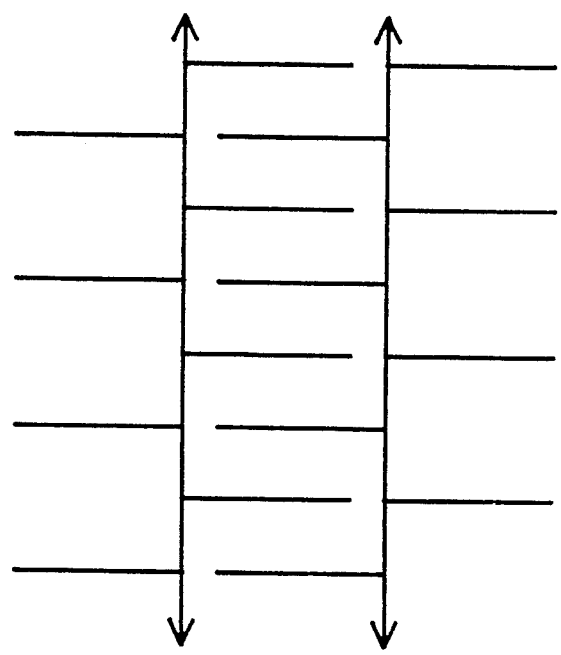
FIG. 15b illustrates the folding back out of the side chains (after completion of linear processing) to yield the strong mechanical properties of the compositions of matter of the present invention.

Processing strong LCPs designed according to the teachings of the present disclosure is easiest if the functional chemical group in the side chain connecting the side chain to the backbone is a relatively small group and is connected by only a single bond to the backbone and by only a single bond to the rest of the side chain. The small size of such a group and the semiflexibility of the single-bond connections will allow the side chain to fold down somewhat, with minimum steric hindrance, parallel to the backbone when linear processing, such as flow through a pipe, of the LCP is required. FIG. 15a schematically illustrates the folding down of the side chains during linear processing. FIG. 15b schematically illustrates the return of the side chains to a substantially perpendicular deployment after the processing step, so that the LCP molecules can align in three-dimensions (that is, with the backbones aligning parallel to one dimension, and the side chains aligning in the other two dimensions) to achieve strong mechanical properties. As shown in FIGS. 2b-2d hereof, good connecting groups include oxygen and sulfur atoms, and the NH and $CH_2$ groups. The flexibility of these groups decreases from oxygen to the $CH_2$ group in the order given, while the size (and thus the steric hindrance) increases from oxygen to $CH_2$ in the order given.

EXAMPLE X

Figure 16B:
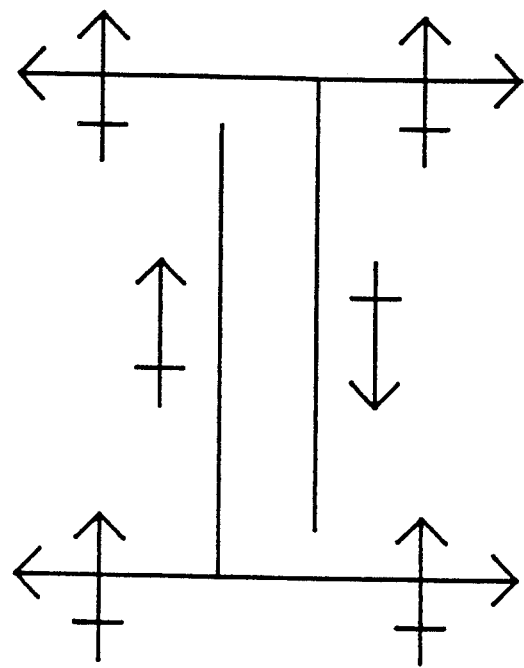
FIG. 16b shows another preferred embodiment of the present invention where the backbone has only transverse dipolar forces and/or hydrogen bonding, while the side chains have only longitudinal dipolar forces.
Figure 16A:
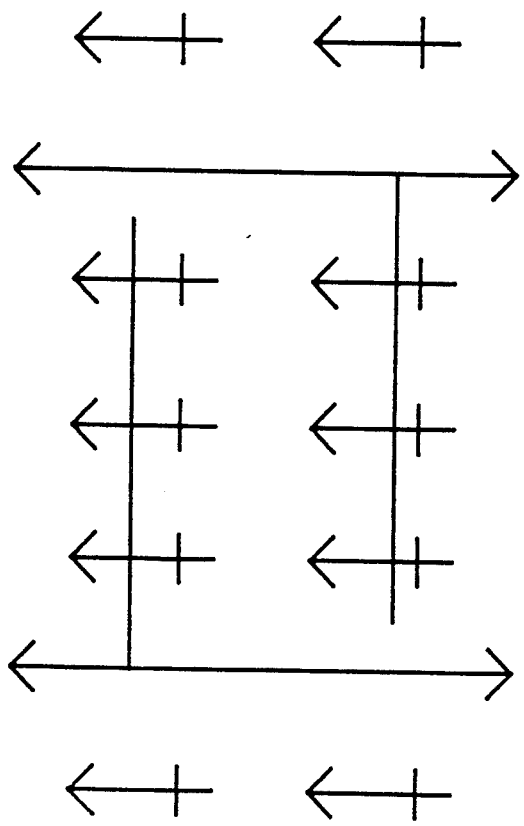
FIG. 16a is a schematic representation of a preferred embodiment of the present invention illustrating a backbone which has only longitudinal dipolar forces, while the side chains have only transverse dipolar forces and/or hydrogen bonding.

Choice of Types of Dipolar and/or Hydrogen Bonding Forces in Backbones and Side Chains for Easy Alignment It is easier to align backbones and side chains in an electric or magnetic field if the backbones and side chains do not both have longitudinal dipolar forces (that is, forces parallel to the long axis of the backbone or the side chain) or do not both have transverse dipolar forces and/or hydrogen bonding. Alignment in such fields is easiest if the backbone has only longitudinal dipolar forces, while the side chains have only transverse dipolar forces and/or hydrogen bonding (as schematically illustrated in FIG. 16a) or vice versa (as is schematically illustrated in FIG. 16b), such that the backbones and side chains can be correctly aligned at the same time by one uniaxial field.

In all of Examples I-X above, the chemical bonding in the strong LCPs designed according to the teachings of my invention are consistent with known chemical principles, and all of the chemical functional groups combined herein are known chemical functional groups found in existing chemical molecules. The LCPs which form the strong compositions of matter of the present invention contain chemical structures that are primarily variations of (1) the backbone LCPs Kevlar, PBT, and PBO; and (2) phenyl structures.

It is predicted that existing processing techniques, which include melt and solution, can be used to process the strong LCPs of the present invention. These processing techniques include linear processing and multiaxial processing. Linear or uniaxial processing includes linear flow, uniaxial mechanical stretching, spinning, application of uniaxial electric or magnetic fields to align dipoles, and extrusion through a uniaxial orifice. Multiaxial processing includes biaxial mechanical stretching and application of electric or magnetic fields to alternate axes of the sample.

The foregoing description of the preferred embodiments of the invention have been presented for purposes of illustration and description. It is not intended to be exhaustive or to limit the invention to the precise form disclosed, and obviously many modifications and variations are possible in light of the above teaching. For example, it would be apparent to one having ordinary skill in the art of LCPs, after reading the subject disclosure, that backbones and side chains containing chemical structures, which are variations on the chemical structures of the LCPs including polyacetylenes, polyazobenzenes, polyazoxybenzenes, polyethers, polyesters, and the like, could be used in a similar manner to design LCPs having good mechanical properties compared with the LCPs in FIGS. 2a-2d hereof. Furthermore, it would also be apparent to one having ordinary skill in the art of LCPs, after reading the subject disclosure, that the repeat units comprising a backbone can be different (i.e., different monomers can be copolymerized) as long as (1) their lengths are substantially similar and (2) the requirements on the side chains set forth hereinabove are met. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A liquid-crystalline polymeric composition of matter having increased compressive strength, tensile strength, and tensile modulus over liquid-crystalline polymeric materials having only backbone structure, said composition comprising a liquid-crystalline backbone which includes repeat units having at least one substantially rigid structural section and at least one pendant liquid-crystalline side chain having a long axis, said at least one liquid-crystalline side chain being spaced apart from other pendant liquid-crystalline side chains disposed on the same side of said backbone such that said liquid-crystalline side chains are attached to and extend outwardly at an angle to said backbone and such that said liquid-crystalline side chains are substantially interdigitated with other side chains attached to adjacent backbones in a manner such that said long axes of said side chains are substantially parallel to each other.

2. The composition of matter as described in claim 1, wherein said at least one pendant liquid-crystalline side chain is attached to one of said at least one rigid structural section of said repeat units of said backbone.

3. The composition of matter as described in claim 1, wherein said at least one pendant liquid-crystalline side chain is attached to said backbone in between said rigid structural sections of said repeat units of said backbone.

4. The composition of matter as described in claim 1, wherein said at least one pendant liquid-crystalline side chain is disposed in such a manner that neighboring pendant liquid-crystalline side chains attached to said backbone are between 8 and 14 A apart along said backbone.

5. The composition of matter as described in claim 1, wherein said at least one substantially rigid structural section of said repeat units is at least 8 A in length.

6. The composition of matter as described in claim 1, wherein said at least one liquid-crystalline side chain has at least one substantially rigid structural section therein having a length of at least 8 A.

7. The composition of matter as described in claim 1, wherein the at least one substantially rigid structural section of said repeat units and said at least one substantially rigid structural section of said at least one pendant liquid-crystalline side chain are selected from the group consisting of aromatic rings, aromatic heterocyclic rings, functional groups having conjugated double-bonded atoms, and functional groups having conjugated triple-bonded atoms.

8. The composition of matter as described in claim 1 wherein each of said at least one pendant liquid-crystalline side chain is connected by a single bond to a small chemical group which small chemical group is connected by a single bond to said repeat unit such that a semiflexible attachment between said backbone and said at least one pendant liquid-crystalline side chain is achieved and wherein said chemical group is selected from atoms or groups of atoms of a size to avoid steric hindrances between the backbone and the side chain.

9. The composition of matter as described in claim 8, wherein said small chemical connecting group is selected from the group consisting of —O—, —S—, —NH—, CH$_2$—,

10. The composition of matter as described in claim 1, wherein said at least one pendant liquid-crystalline side chain is substantially symmetrical in atomic composition about the approximate midpoint of said pendant liquid-crystalline side chain.

11. The composition of matter as described in claim 1, in which said repeat units are identical.

12. The composition of matter as described in claim 1, in which said side chains are identical.

13. The composition of matter as described in claim 1, in which each of said side chains on the same side of said backbone are identical.

14. The composition of matter as described in claim 1, wherein said backbone includes at least ten of said repeat units.

15. The composition of matter as described in claim 1, wherein the spacing between adjacent interdigitated pendant liquid-crystalline side chains from different backbones is approximately 4–7 A.

16. The composition of matter as described in claim 1, wherein said at least one pendant liquid-crystalline side chain is less than 60 A.

17. The composition of matter as described in claim 1, wherein said at least one pendant liquid-crystalline side chain includes at least one chemical group for generating substantially unidirectional longitudinal forces relative to said side chain, and said backbone repeat unit includes at least one chemical group for generating substantially unidirectional transverse forces relative to said backbone.

18. The composition of matter as described in claim 17, wherein said at least one chemical group for generating substantially unidirectional forces is selected from the group of chemical groups consisting of dipolar groups and hydrogen-bonding groups.

19. The composition of matter as described in claim 1 wherein said at least one pendant liquid-crystalline side chain includes at least one chemical group for generating substantially unidirectional transverse forces relative to said side chain, and said backbone repeat unit includes at least one chemical group for generating substantially unidirectional longitudinal forces relative to said backbone.

20. The composition of matter as described in claim 19, wherein said at least one chemical group for generating substantially unidirectional forces is selected from the group of chemical groups consisting of dipolar groups and hydrogen-bonding groups.

21. A liquid-crystalline polymeric composition of matter having increased compressive strength, tensile strength, and tensile modulus over liquid-crystalline polymeric materials having only backbone structure, said composition comprising a liquid-crystalline backbone which includes repeat units having at least one substantially rigid structural section and at least one pendant liquid-crystalline side chain having a long axis, said at least one liquid-crystalline side chain having at least one substantially rigid structural section therein having a length of at least 8 A, said at least one liquid-crystalline side chain being spaced apart from other pendant liquid-crystalline side chains disposed on the same side of said backbone such that said liquid-crystalline side chains are attached to and extend outwardly at an angle to said backbone and such that said liquid-crystalline side chains are substantially interdigitated with other side chains attached to adjacent backbones in a manner such that said long axes of said side chains are substantially parallel to each other, said at least one pendant liquid-crystalline side chain being attached to one of said at least one rigid structural section of said repeat units of said backbone and being disposed in such a manner that neighboring pendant liquid-crystalline side chains attached to said backbone are between 8 and 14 A apart along said backbone, each of said liquid-crystalline side chains being less that 60 A in length, each of said side chains on the same side of said backbone being identical, each of said at least one substantially rigid structural sections of said repeat units being at least 8 A in length, a small chemical group connected by a single bond to said at least one substantially rigid structural section of at least one of said repeat units and connected by a single bond to said at least one pendant liquid-crystalline side chain of said at least one of said repeat units such that a semiflexible attachment between said backbone and said at least one pendant liquid-crystalline side chain is achieved and wherein said chemical group is selected from atoms or groups of atoms of a size to avoid steric hindrances between the backbone and the side chain, and said backbone including at least ten of said repeat units.

* * * * *